7 Sheets--Sheet 4.
J. P. COLNE & C. COLNE.
Machine for Cutting and Polishing Glass, &c.
No. 133,204. Patented Nov. 19, 1872.
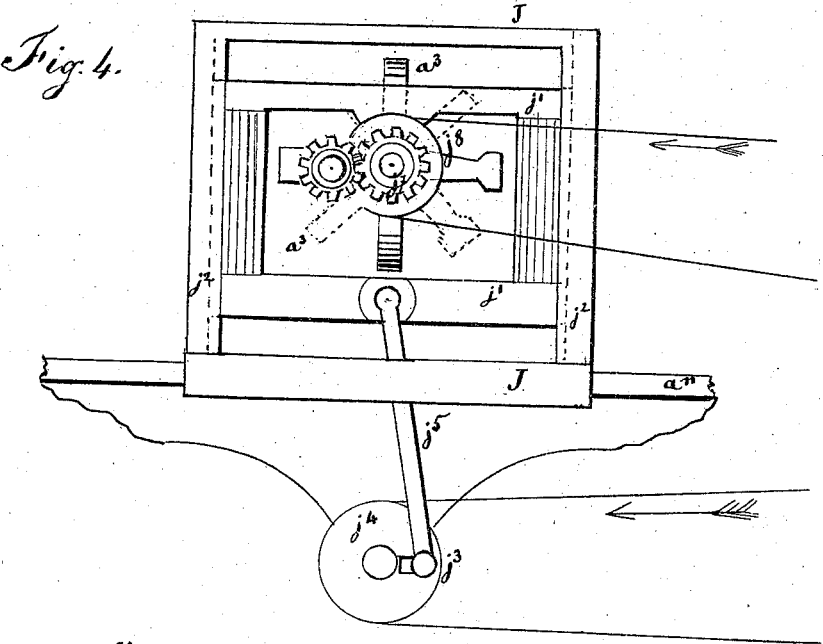
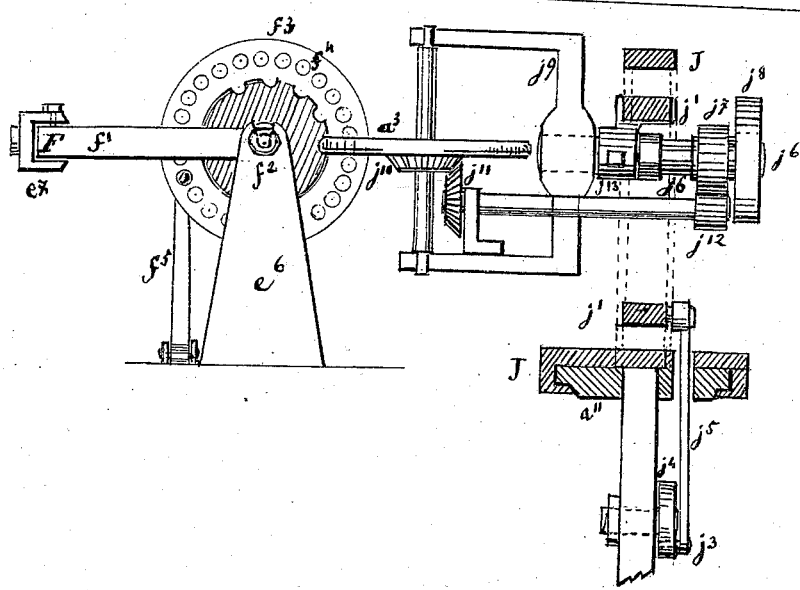
Witnesses:
Inventors:
Jean Pierre Colné
Charles Colné

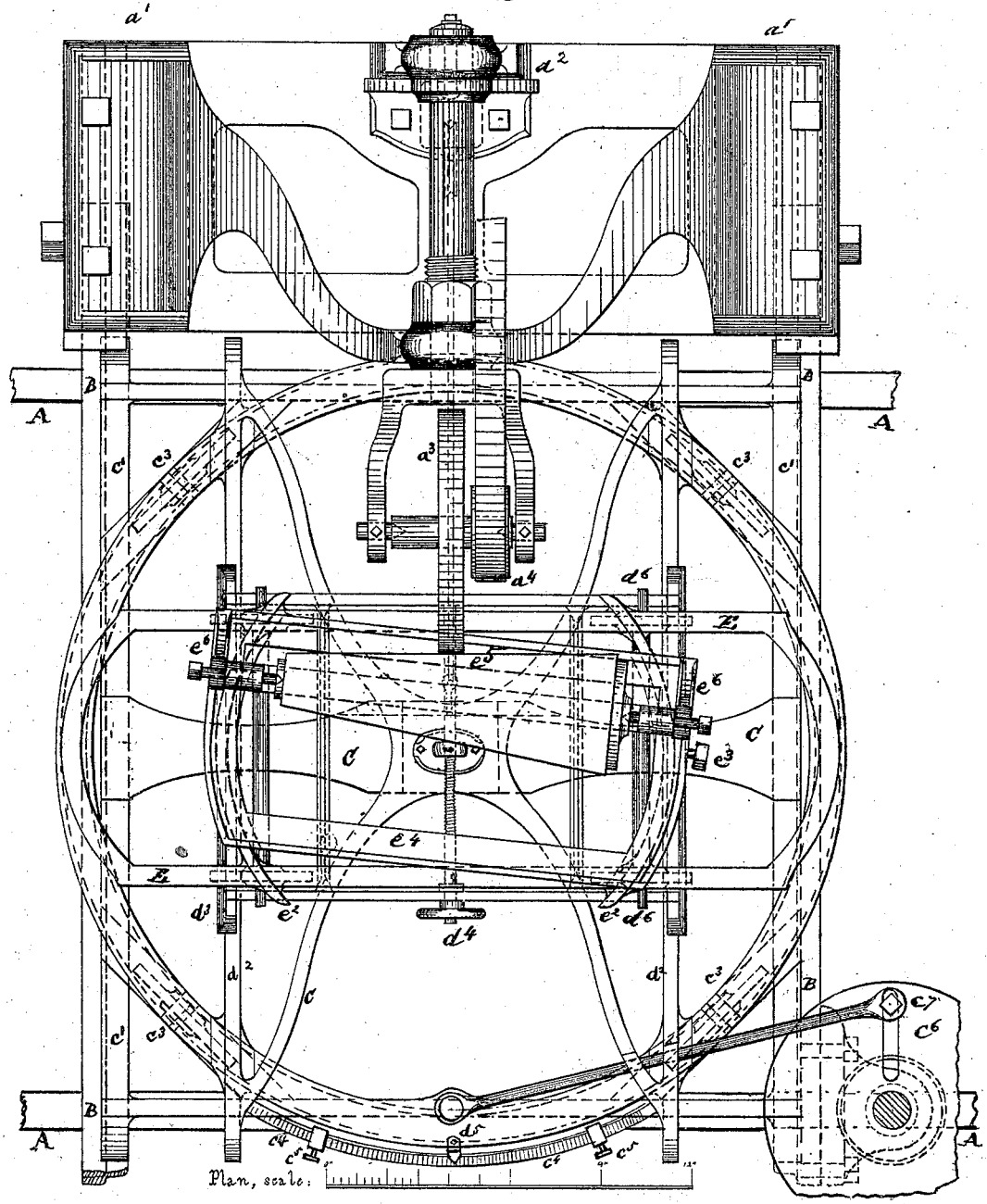

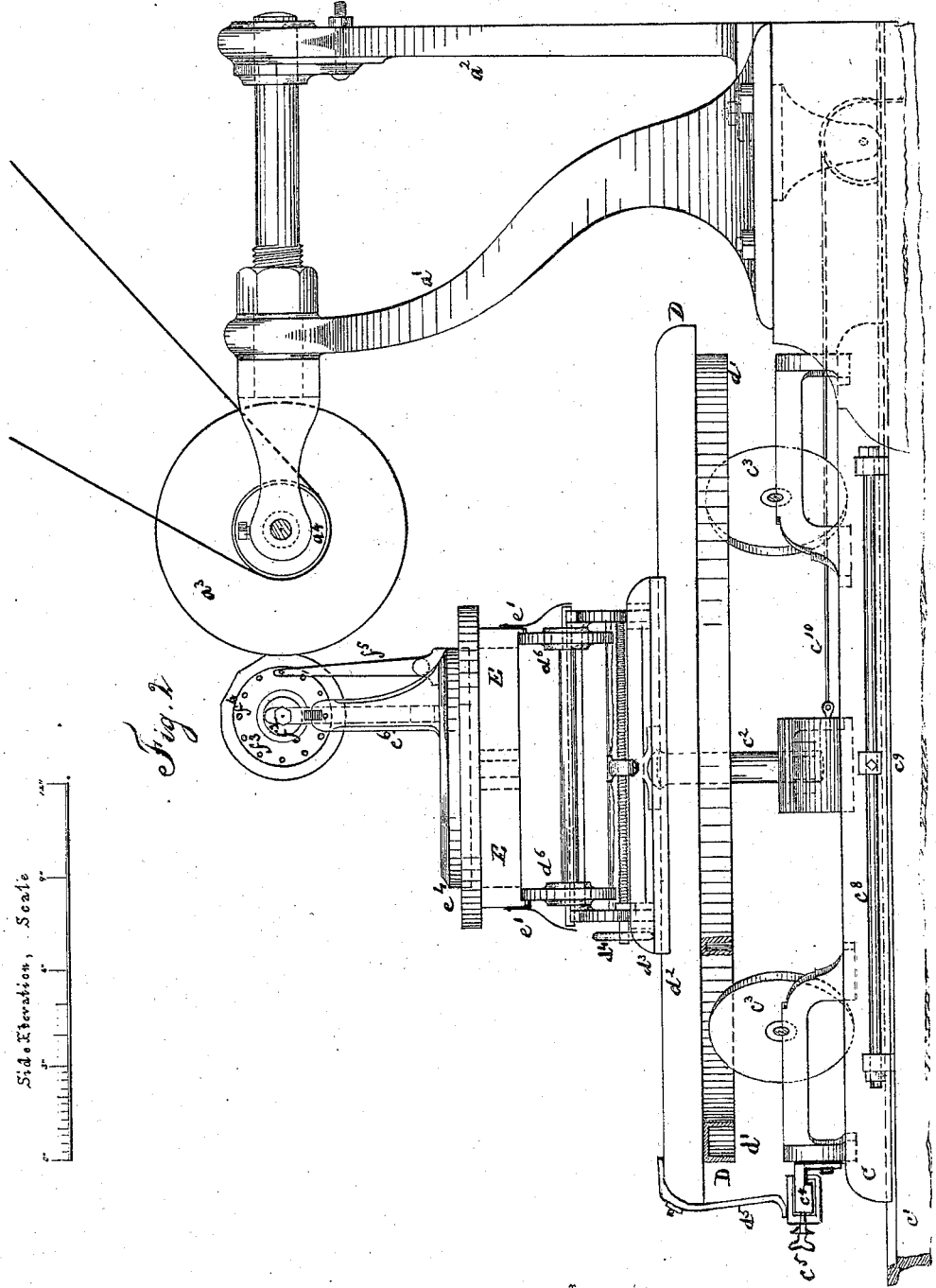

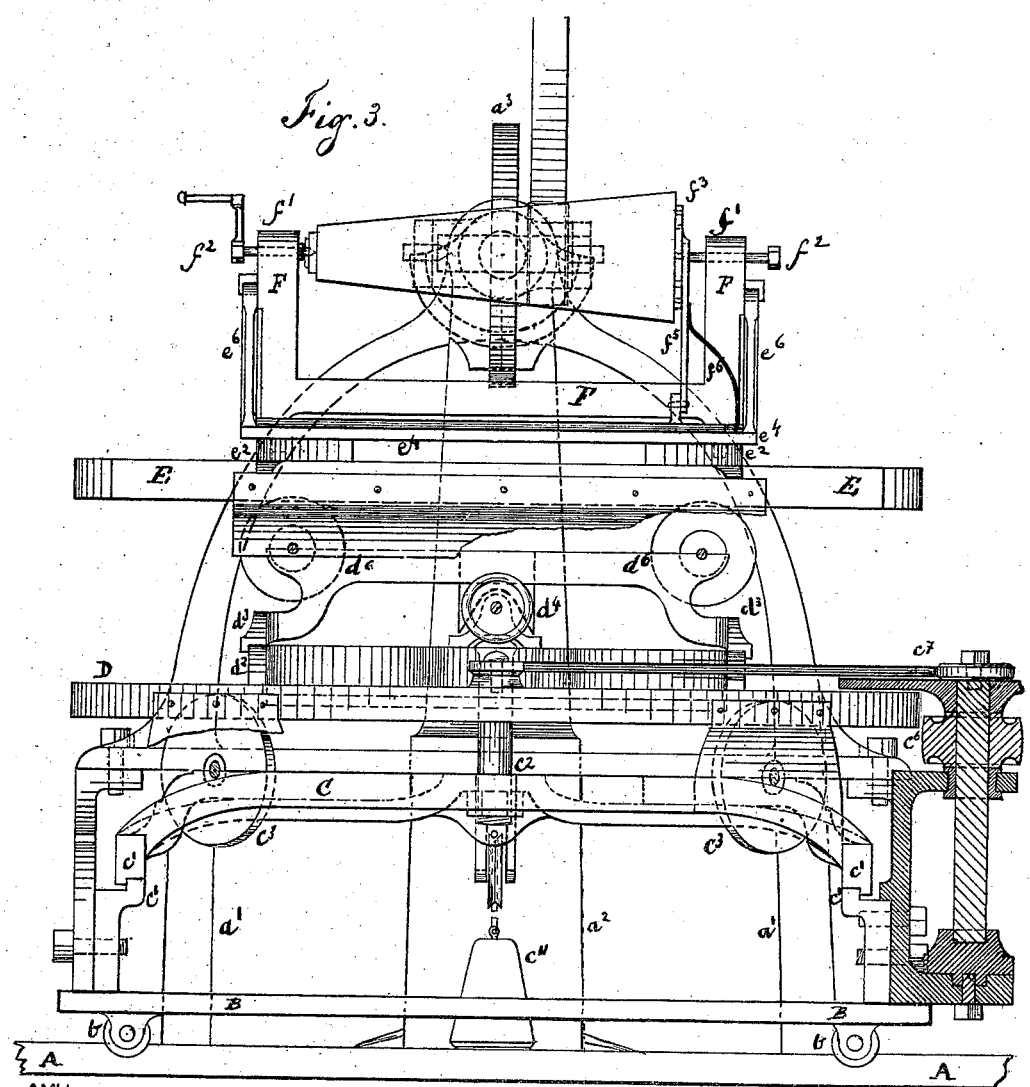

7 Sheets--Sheet 5.
J. P. COLNE & C. COLNE.
Machine for Cutting and Polishing Glass, &c.
No. 133,204. Patented Nov. 19, 1872.
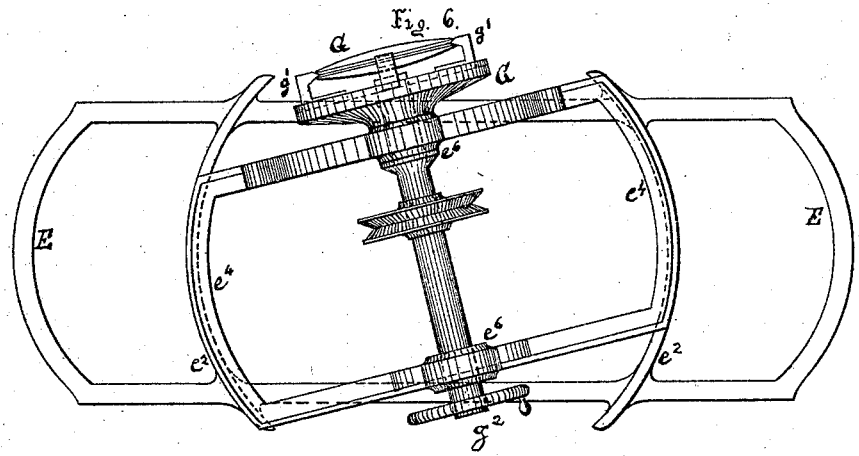
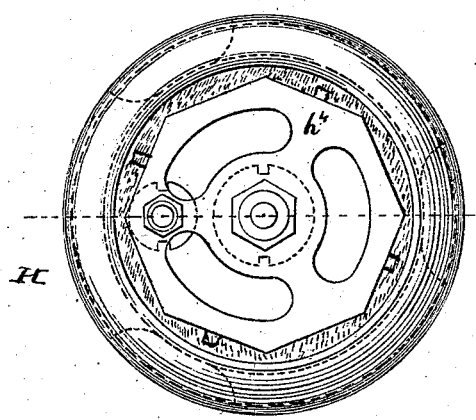
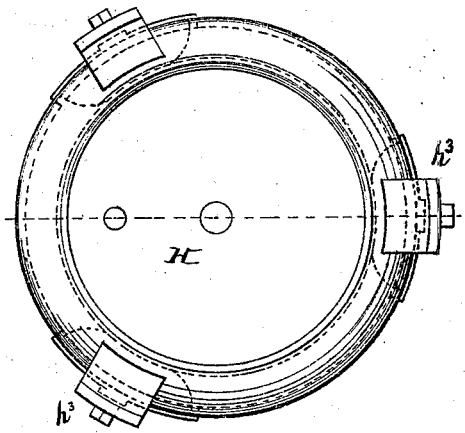
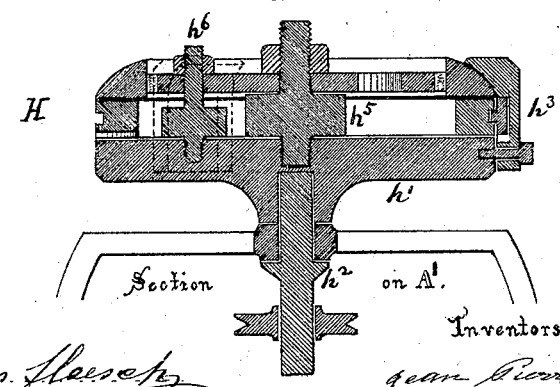
Witnesses: Charles Fleesch, Jos. T. K. Plank
Inventors: Jean Pierre Colne, Charles Colne 7 Sheets--Sheet 6.
J. P. COLNE & C. COLNE.
Machine for Cutting and Polishing Glass, &c.
No. 133,204. Patented Nov. 19, 1872.
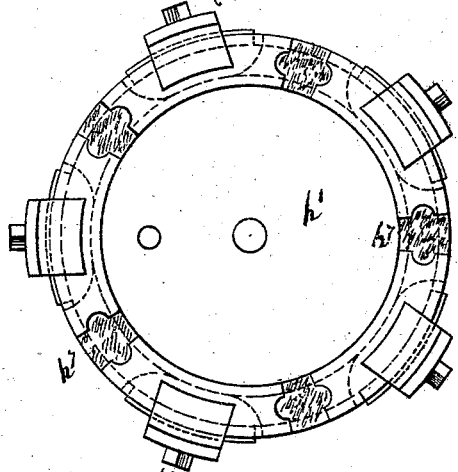
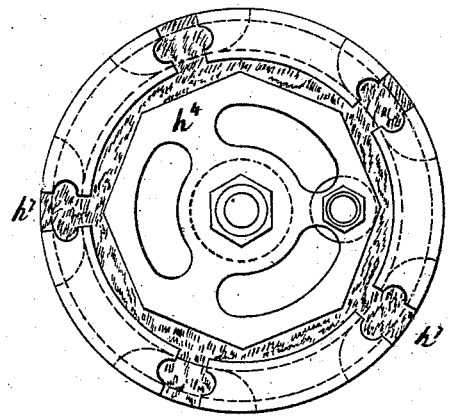
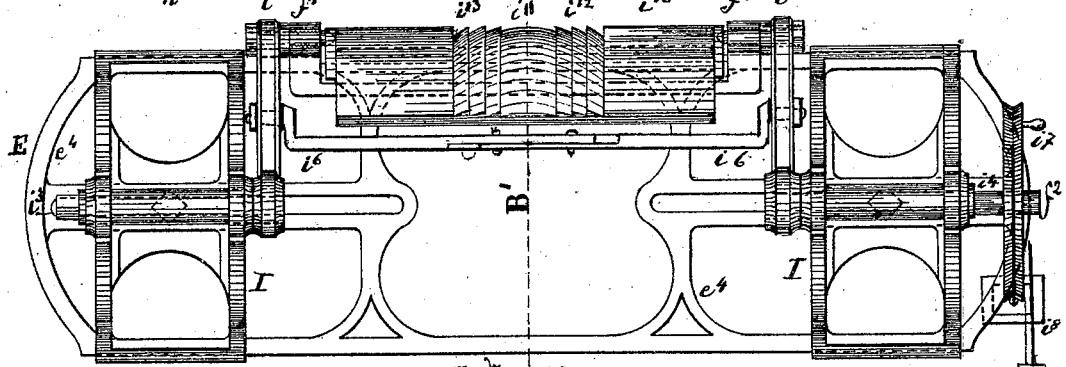
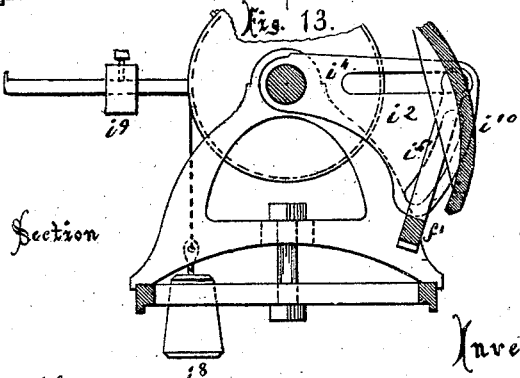
Witnesses:
Charles Flaesch
Jos. T. K. Plant
Inventors:
Jean Pierre Colne
Charles Colne 7 Sheets--Sheet 7.
J. P. COLNÉ & C. COLNÉ.
Machine for Cutting and Polishing Glass, &c.
No. 133,204.    Patented Nov. 19, 1872.
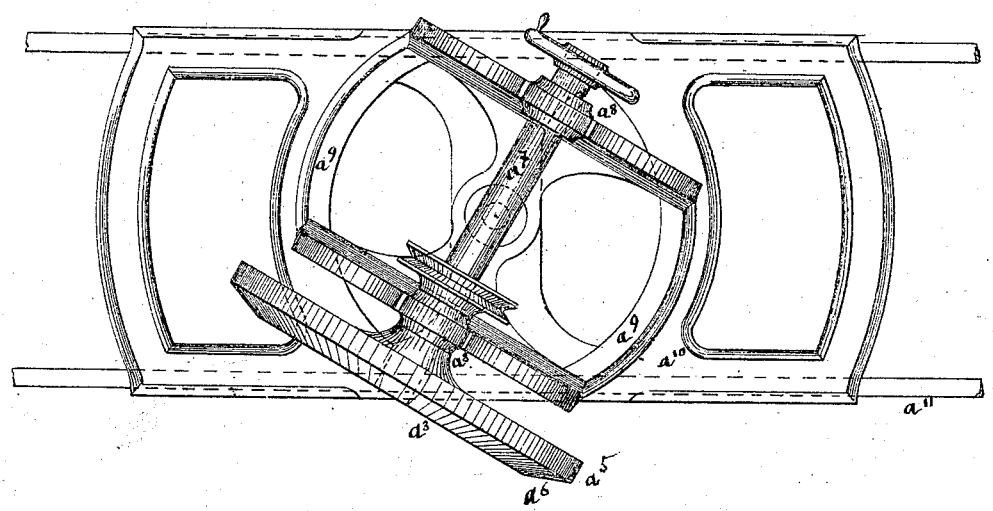
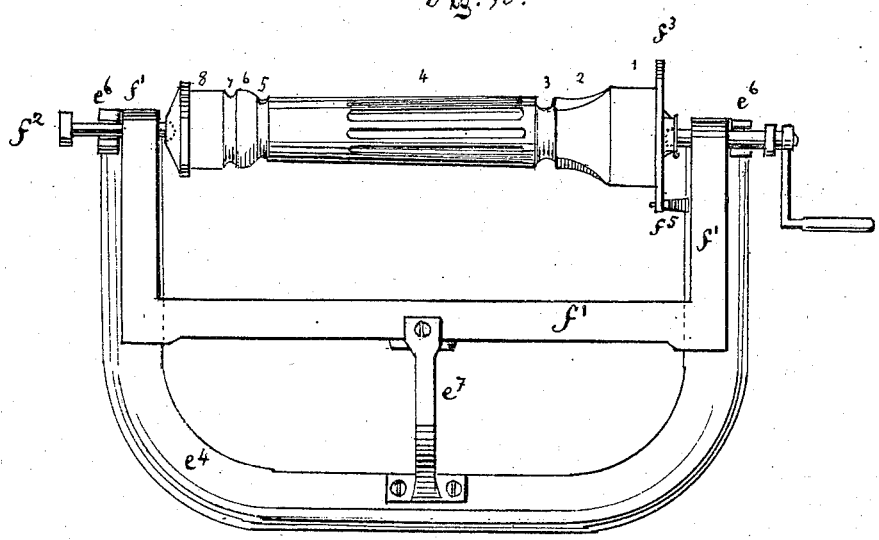
Witnesses  
Charles Flesch  
Jos. T. K. Plant
Inventors:  
Jean Pierre Colné  
Charles Colné

UNITED STATES PATENT OFFICE.

JEAN PIERRE COLNÉ AND CHARLES COLNÉ, OF WASHINGTON, DISTRICT OF COLUMBIA, ASSIGNORS OF ONE-HALF OF THEIR RIGHT TO EDWIN JAMES HULBERT AND AIMÉ NICHOLAS NAPOLEON AUBIN, OF PORTLAND, CONN.

IMPROVEMENT IN MACHINES FOR CUTTING AND POLISHING GLASS, &c.

Specification forming part of Letters Patent No. 133,204, dated November 19, 1872; antedated November 16, 1872.

*To all whom it may concern:*

Be it known that we, JEAN PIERRE COLNÉ and CHARLES COLNÉ, of Washington, District of Columbia, have invented an Improved Machine for Cutting and Polishing Glass, Gems, Marble, Stones, and other similar substances, of which the following is a specification:

The first part of our invention relates to the manner of holding the object to be cut firmly enough to prevent vibration, enabling the operator to detach it from the machine when desired, and to replace it promptly and easily, or to attach it to another machine for further shaping or polishing without having to readjust it. The second part of our invention relates to the manner of presenting the object to the grinding-wheel so that it may have a longitudinal, lateral, or diagonal motion; also a horizontal or vertical, circular, or rotary motion, or a combination of these several motions, so as to produce automatically and with mathematical precision any desired form independently of the skill of the operator. The third part of our invention relates to the manner of supporting and actuating the grinding-wheel so that it can have, besides its rotary motion, a rectilinear movement for producing plane surfaces; also causing it to revolve on an inclined or vertical axis for certain special purposes, such as cutting prismatic forms, fluting columns, or producing any other desired profile. The fourth part of our invention relates to the manner of producing convex or concave curves with mathematical precision as to their form and relative position on a common axis, and of thereby facilitating at the same time the mounting and setting of optical glasses or other objects. The fifth part of our invention relates to the manner of securing to and placing upon the machine cylinders of glass or sections of the same, so that they can be shaped outside as required and have their interior surface turned in one or more perfectly concentric circles, or to have refracting or reflecting angles cut longitudinally or concentrically with the outside profile, such as are required for different purposes of illumination, or which may be desired for special useful application in the arts or for ornamentation. The sixth part of our invention relates to cutting a groove around glass disks for adjusting them on the machine, and in the instruments for which they are intended.

Figure 1 is a plan of the machine as constructed for cutting articles of comparatively small dimensions where no strictly plane surfaces are required. Fig. 2 is a side elevation of the same. Fig. 3 is an end elevation. Fig. 4 is a back view of the arrangement for causing the grinding-wheel to raise and descend for forming plane surfaces. Fig. 5 is a side view, showing the same with the grinding-wheel stationary, but revolving in a horizontal position for grooving or fluting; and also, if desired, cutting plane surfaces in a longitudinal direction. Fig. 6 is a top view of the attachment for holding and cutting lenses. Fig. 7 is a plan of the attachment for cutting dioptric rings for light-house illumination. Fig. 8 is a plan of the same attachment with ring as arranged when its internal surface is to be cut. Fig. 9 is a section of the above. Fig. 10 shows how sections of dioptric rings are held for cutting the internal surface. Fig. 11 shows the same as held while cutting its external periphery. Fig. 12 is a plan of the attachment for holding sections of a whole side of a lantern to be cut with circular and angular ridges on the principle of the Fresnel dioptric lenses. Fig. 13 is a section across the center of the same. Fig. 14 is a top view of the cutting or grinding wheel for grinding the face of lenses or other similar surfaces; also by prolonging the shaft for shaping the interior of cylinders. Fig. 15 illustrates the manner of holding and shaping a pilaster, offering the forms most usually required in glass or marble cutting.

A A, Fig. 3, frame firmly fixed to the floor at a convenient height for the workman, and bearing all the other parts of the machine as well as the stand $a^1 a^1$ and upright pillow-block $a^2$, bearing the grinding or cutting wheel $a^3$ and the pulley $a^4$; B B, lower sliding frame, on which rests the center bearing-platform. The lower sliding frame can move on slides or rails, or it may be provided with rollers $b\ b$.

It is used only when an object of large dimensions has to be moved longitudinally before the cutting-wheel. It is provided with proper stops to regulate the extent of its motion, or to make it stationary when not required; C C, center bearing-platform. It can move toward or from the grinding-wheel upon flat slides, $c^1$ $c^1$, or on anti-friction rollers. It bears in the middle an upright center-pin, $c^2$, which serves as the center of revolution for the parts of the machine resting upon it. It is provided with wheels or anti-friction rollers, $c^3$ $c^3$, disposed on the line of a circle for the turn-table placed above it. A portion of the circumference bears divisions of the circle $c^4$ and sliding stops $c^5$, with set-screws attached to them, and so disposed on the segment of the circumference as to regulate the extent of the semicircular motion of the object to be cut when the turn-table is moved by hand. The reciprocal circular motion can also be produced by a pulley-drum, $c^6$, and adjustable crank $c^7$. The rectilinear motion of the center bearing-platform or frame is regulated by guide-bars $c^8$, provided with rings $c^9$ and stops, and it can be made automatic when effected toward the cutting-wheel by a rope, $c^{10}$, and weight $c^{11}$. The center of rotation of the turn-table regulates the kind of curve to be produced. If the object to be cut be placed between the center and the cutting-wheel the curve is convex. If it be placed beyond the center the curve is concave. The distance, horizontally, between the center and the object forms the radius of the curve. D D, turn-table. It is a circular frame provided with a flat ring with two flanges forming a groove, $d^1$ $d^1$, which runs upon the anti-friction-rollers $c^3$ $c^3$ of the center bearing-platform. It bears an oblong fixed frame, two sides of which serve as slides, $d^2$ $d^2$, for the adjusting-frame $d^3$ $d^3$ to rest on, upon which it is adjusted by means of a long regulating-screw, $d^4$ $d^4$, running in a female screw attached to the bearing-carriage. It is provided with an index, $d^5$, which travels over the divided segment, and strikes against the stops to regulate the extent of its circular motion. The adjusting-frame $d^3$ is provided with four bearing-wheels or anti-friction rollers, $d^6$ $d^6$, upon which slide longitudinally the bearing-carriage E. E, bearing-carriage. It is a square or oblong frame. The lower surface of two of its sides $e^1$ $e^1$ is provided with a flange, and it slides upon the rollers $d^6$ $d^6$. Its upper surface is provided with two projecting, partly circular and concentric, segments, $e^2$ $e^2$, with a set-screw, $e^3$. These segments are thus arranged to receive between them corresponding segments attached to the bearing-frame $e^4$ $e^4$, and allow this frame to be adjusted in any parallel or diagonal position with respect to the body of the machine. By this arrangement an object can be cut in a conical form wherever desired by being placed diagonally with respect to the cutting-wheel, and the bearing-carriage being moved longitudinally in front of the wheel, as shown at $e^5$ $e^5$, Fig. 1. The bearing-frame $e^4$ has two uprights, $e^6$ $e^6$, and a rest, $e^7$, to receive and secure the holder F and the object to be shaped. F F, holders. Their use is to hold the objects to be cut, and to present them in rapid succession to the cutting-wheel for producing each of the different lines of the desired profile in a perfectly uniform manner and with mathematical accuracy. Each holder is composed of a strong wrought or cast iron bar with two arms, $f^1$ $f^1$, projecting at right angles. Through the ends of these bars are tapped two screw-holes, which receive the screwed center-pins $f^2$, which hold the object to be cut firmly by pressing against two disks lined with lead, India rubber, or other soft substance, when necessary. The screwed pins bear upon the forked end of the uprights $e^6$ $e^6$. One of the disks, $f^3$, acts as a dividing-plate, by having holes $f^4$ drilled in a circle around the center at such distances and in such number as it is desired to have sides cut into the object to be shaped. The disk $f^3$ is held in position by the arm $f^5$ provided with a projecting pin fitting exactly in the dividing holes. A spring, $f^6$, keeps it in place. One of the center-pins $f^2$ is provided with a crank, which can be turned by hand for cutting circular forms on light objects. For heavy articles a pulley moved by a belt can be substituted for the crank. G, centering-chuck for holding lenses, Fig. 6. The end of the three jaws $g^1$ are made very angular, so as to fit a groove previously cut in the edge of a disk of glass. This groove can serve, after the lens is finished, to mount and adjust it into the instrument for which it is intended. The chuck being placed upon the bearing-frame, as shown in the drawing, Fig. 6, the focus of the desired radius is brought over the center of the turn-table, where it is fastened. Then, by vibrating the turn-table to the right and left and bringing forward the bearing-carriage to the proper degree of penetration to secure the grinding of every part of the lens' surface, turning the crank $g^2$ at the same time, a curve is produced which must evidently be a section of the circumference of a sphere with a radius regulated by the center of rotation, and also an axis exactly at a right angle with the groove around the lens. It is easily perceived that a corresponding convex curve can be cut on the opposite side of the same disk by reversing the glass on the chuck. A concave curve for producing a perfect meniscus with a true axis is obtained by reversing the lens upon the chuck and bringing the bearing-carriage so that the focus of the radius is brought to a point back of the outside edge of the cutting-wheel equally distant from the center of the turn-table, less the thickness of the glass, as it was in front of the wheel when cutting the convex side.

The advantages offered by the groove, above referred to, cut in the edge of the disk of glass to be shaped into a lens are manifold. By that means the disk is easily adjusted and held in the centering-chuck, and a true and common axis secured for the two sides of the lens. In the methods now in general use the disk is held by cement, and when one side is shaped it is reversed to be cemented again, no strictly accurate guide being used for securing the relative position of the curves. This requires on the part of the operator a degree of practical dexterity which many years of labor can only secure. The uncertainty of the operation and the time necessary for accomplishing it sufficiently explain the high price which such articles command. A few minutes of labor in our machine are sufficient to produce a perfectly-shaped lens. The groove around the edge serves also to facilitate the work of the optician, who can thus easily mount a lens in a telescope or *camera obscura* with the utmost certainty of having the two focuses in a straight line and in the center of the tube to which they are to be attached. The form of wheel we adopt for grinding the face of lenses or other optical instruments as better calculated to preserve the integrity of the curves of a large radius is the one shown at Fig. 14. It will be perceived that the wheel $a^3$ has a straight periphery, $a^5$, and a bevel, $a^6$, which can be made broader than the periphery of an ordinary wheel without increasing its size. It is keyed to the end of a shaft, $a^7$, and can be made to penetrate the inside of a ring or cylinder by merely prolonging the end of the shaft to which the wheel is fixed. By having the periphery of the wheel angular, or otherwise shaped, corresponding forms can be cut on the internal surface of cylinders, such as lanterns or other appliances used for illumination. The shaft runs in two pillar-blocks, $a^8$, fixed to a pivoting-platform, $a^9$, bolted in its center to the frame $a^{10}$, which can be attached to the main pillar-block table $a^{11}$ supported by the stand $a^1 a^1$, Figs. 1, 2, and 3. This arrangement allows the wheel to be placed in any diagonal position, as seen in Fig. 14. H H, Figs. 7, 8, 9, 10, and 11, is the chuck used for cutting rings in one or more pieces when they have to be cut and polished on all their surfaces. It is composed of a main plate, $h^1$, screwed upon a shaft, $h^2$, which holds it upon the carrying-frame, and is furnished with a crank or a pulley to cause it to revolve. On the periphery of the plate are screwed adjustable jaws $h^3$ for holding the ring in position by pressing upon its exterior and upper surfaces. In the interior is a movable polygonal disk, $h^4$, with exterior projections, which may be fixed or adjustable, if desired. This disk is centered by means of the short shaft $h^5$, and is compelled to turn with the main plate $h^1$ by means of the pin $h^6$.

The operation of this chuck is as follows: The ring of glass is placed upon the main plate and centered as near as possible by the jaws $h^3$ and the polygonal disk $h^4$. A cement composed of plaster or other equivalent substance is run upon the disk, which it surrounds, and thus binds the glass ring to it. When the cement is set the jaws are removed and the exterior surface of the ring is shaped, receiving the required curve from the combined reciprocal motion of the turn-table and the revolution of the main plate on its own axis. When that part of the work is finished the disk and ring are inverted; then the under or flat surface of the ring is exposed and presented to the cutting-wheel, which grinds upon it a perfectly plane surface exactly at a right angle with the axis of the ring itself. When this part is finished the jaws are put on and properly tightened, the interior polygonal disk and cement are removed, and the interior periphery of the ring is shaped by exposing it to the grinding action of a wheel smaller than its own interior diameter, and fixed upon the end of a projecting shaft. The ring, when made of sections with space allowed for the mounting, as required for large light-house dioptric or catadioptric glasses, is fixed as seen in Figs. 10 and 11, the spaces $h^7$ being filled by the cement above referred to. Small adjustable clamps may also be placed in the spaces $h^7$ to render the cementing stronger. It may be found preferable to commence the operation by grinding the flat part of the ring first. When it is desired to work a whole segment of a compound lens for light-house, signal, ship, wharf, or large street lights, the rocking-bearer, shown in Figs. 12 and 13, is used.

I I, rocking-bearer. It is composed of two arms, $i^1 i^2$, projecting from shafts $i^3 i^4$, each working in two pillar-blocks fixed to the bearing-frame $e^4$. The arms are provided with straight center slots $i^4$, in which the holder $f^1$ is adjusted. $i^5$ are two slots (one of which is not shown in the drawing) in which are fixed two adjustable stiffening-bars, $i^6$, firmly screwed upon the arms to secure their parallelism. The end of the rocking-shaft $i^4$ is provided with a crank, $i^7$, for moving the bearer and glass segment. A counterpoise, $i^8$ or $i^9$, putting the whole arrangement in equilibrium, facilitates the rocking of the glass segment, and requires but a slight exertion on the part of the operator. $i^{10}$ is the glass segment to be shaped.

The operation is performed as follows: The glass is firmly secured upon the holder, so that its curved part may be as concentric as possible with the rocking-shafts. The carriage is fixed upon the turn-table so that the focal radius of the spherical curve corresponds with the center of horizontal revolution of the turn-table. The face of the cutting-wheel used is diagonal, to form the perpendicular edge of the rings. The center lens $i^{11}$ is cut by the ordinary wheel with straight periphery. This form is obtained by moving the turn-table to the right and left alternately. The extent of the motion is regulated by the stops $c^5$ on the divided circle $c^4$, Fig. 1. When the center lens is formed the angular wheel, with its cutting-angle to the right, is used to form the rings $i^{12}$; after which it is inverted to cut the rings $i^{13}$. The depth of the rings or penetration is adjusted by stops regulating the rectilinear motion of the center bearing-frame C. To form the interior of the segment, and give it either a cylindrical shape or cutting rings corresponding with the outside ones, it is merely required to reverse the glass segment, without removing it from its holder, so that the concave side is offered to the cutting-wheel, whose diameter must then be smaller than the radius of the glass cylinder. The wheel has to work then between the rocking-shafts. It can be easily understood how these three motions—first, the vertical rocking; second, the horizontal vibratory motion; and third, the alternate rectilinear motion—can be executed simultaneously by an operator without any great exertion of mind or body, and are so regulated as to secure the most perfect uniformity for any number of pieces. When the pieces to be shaped are to have some plane surfaces or diagonal cuttings, the mode of supporting the cutting-wheel shown in Figs. 4 and 5, or some equivalent method, must be adopted. J, Figs. 4 and 5, is the frame adjusted to the pillar-block table $a^{11}$. $j^1$ is a sliding frame moving in grooves indicated by the dotted lines $j^2$. The up-and-down motion is caused by the adjustable crank $j^3$, the pulley-wheel $j^4$, and the connecting-rod $j^5$. The box $j^{13}$ attached to the sliding frame bears the adjustable but fixed shaft $j^6$, which supports at one end the driving-wheel $j^7$ and the pulley or drum $j^8$, both of which revolve upon it and together. To the other end of the shaft $j^6$ is fixed the frame $j^9$, bearing the cutting-wheel $a^3$, to the shaft of which the miter-wheel $j^{10}$ is keyed. This receives its motion from the miter-wheel $j^{11}$ and the pinion $j^{12}$. It will be easily understood, by an examination of the drawing, that by this arrangement the cutting-wheel can be placed in a vertical position or diagonally, as shown by the dotted lines, Fig. 4, or horizontally, as shown in Fig. 5. In every position it receives its rotary motion without altering any part of the driving gearing.

We do not now intend to claim separately the mechanical arrangement for transmitting motion to a rotary tool in different positions which we have just described, but confine ourselves to its application to our machine for cutting glass &c., reserving to ourselves the right of making it the subject of another application for a patent for its adaptation to other general purposes.

It must be observed here that the scale used in the drawing is intended merely for a machine of medium size, calculated to shape all the articles required for ordinary household use.

The machine intended for gems or small optical glasses would, of course, be smaller, and those intended for columns, obelisks, or other parts of monuments would, of course, have to be of larger dimensions. Aprons of metal or of India rubber, as seen hanging from $e^1$, Fig. 2, are placed wherever necessary to keep the sand used in cutting from falling upon any of the slides or anti-friction rollers. These aprons are very important, as, from the nature of the work performed, where sand is constantly used, it is very difficult or almost impossible to keep the machine at work without this protection.

The machine being constructed substantially as described, its operation is as follows: Supposing, for example, that a pillar—as shown in Fig. 15—of glass, marble, serpentine, or other substance of that nature, is to be cut, a piece of material of the proper size is prepared of the required length, and truly squared at both ends. If of glass, it might be molded or blown of the required dimensions in a wooden or other mold. It is adjusted in the holder $f^1$, and, if a great number of the same kind are required, an equal number of holders are prepared, so as to save further readjustment. It is placed then upon the forked end of the uprights $e^6$, attached to the carrying-frame $e^4$, and secured in that position by cross-pins or otherwise, the object to be shaped being made to revolve on itself with the two disks, one of which, the dividing-wheel $f^3$, is turned by the crank, or a pulley driven by power when the object is of large dimensions. The carrying-frame is adjusted upon the bearing-carriage so that the longitudinal motion of the object will be parallel with the axis of the pillar to be cut. The center bearing-frame is brought in position so that its center be opposite the cutting-wheel. The rectilinear motion is adjusted by means of the stops, so that the penetration of the wheel will reach to the straight line No. 1. The dividing-disk is made fast by the arm $f^5$, and its pin falling in one of the holes which can divide the circle into four equal parts if the base No. 1 is to be square, or into six if it be desired to have it hexagonal. The bearing-carriage is moved to the left, so that the right edge of the cutting-wheel can come into line with the left side of the dividing-disk $f^3$. A stop is fixed so that the carriage E cannot move further to the left, and another stop is fixed to the right so that the carriage cannot move in that direction further than the length of line No. 1. The cutting-wheel is set in motion, so that it will revolve, and also move up and down, as before explained. The operator moves the carriage to the right, and one side of the base is soon cut perfectly flat and parallel with the axis of the pillar. The next side is made by turning the object so that the pin $f^5$ will fall in the proper dividing-hole, and the operation is repeated as before described until the base is finished. The part No. 8 can then be made by moving the bearing-carriage to the right, and regulating its motion so as to cut the part 8 of the pillar. The part 2 is made by a longitudinal motion of the carriage, a vibratory motion of the turn-table, a penetration of the center bearing-frame, and an alternate rectilinear and vertical motion of the cutting-wheel frame. This is made in two distinct operations. The pillar is divided and cut first into four equal semi-conical and curved parts; then the corners are cut by the same motions, but with less penetration. Part 3 is cut by a cutting-wheel with a rounded periphery, a rotary motion of the pillar, and a regulated penetration of the center bearing-platform. Part 4 is made by fixing the carrying-frame in a slightly diagonal position upon the bearing-carriage, so that the longitudinal line of that part which is desired to be conical will run parallel with the line of motion of the carriage. The dividing-disk is left free to turn by withdrawing the stopping-pin $f^5$. The crank is turned while the carriage is moved right and left and the center bearing-frame moved forward until it has reached the stops which regulate the size of that conical portion 4 of the pillar. When a truncated cone of the required length and breadth has been formed, the cutting-wheel with periphery of proper shape is placed horizontally, and its frame fixed so that the wheel shall be opposite the axis of the pillar. The dividing-disk is made stationary by the pin $f^5$, the degree of depth and the length of the flutings are regulated by the stops, and the bearing-carriage is moved right and left longitudinally until one ridge is cut. Then the pin $f^5$ is withdrawn, and the pillar turned so as to bring the next proper dividing-hole in position for the pin to fix it there. The second fluting is cut as was the first, and the operation is repeated until that part of the pillar is finished. The part 5 is cut as was part 3. The part 6 is cut by a vibratory motion of the turn-table, the stop toward the right on the divided segment of the circle being fixed further to the right of the center than the other to the left of it, the pillar being rotated by means of the crank. In that way the inclined curve 6 is produced. While this is being done the grinding-wheel rises and lowers. Part 7 is cut as 3 and 5, the wheel also working up and down, and the dividing-disk adjusted to produce four sides. When the object has been shaped as described it is taken to the smoothing and polishing machine and subjected to the usual treatment required for finishing, smoothing, and polishing it. The processes of smoothing and polishing being carried on in the same manner as the cutting, the forms, curves and sharp edges are more perfectly preserved than can possibly be done when the objects are held by hand.

By what precedes, it can be seen that nearly all forms can be obtained with our machine, in combination with a cutting or grinding wheel—flat or diamond-shaped surfaces, circular grooves, rings, moldings, fillets, prisms, flutes, diagonal curves—in a word, all shapes found in decanters, vases, pedestals, cups, goblets, pyramids, tablets, &c.; also profiles of glass or marble plates for inlaid work can be shaped in the most regular manner.

Our system offers another advantage which cannot be possibly accomplished by the present method of cutting glass by hand, viz., the facility offered by it of producing exact duplicates of articles manufactured previously, and which may be broken. The manufacturer, by keeping a register of the different objects, an outline with the degrees of curves, radiuses, length, and penetration of the different surfaces, can always adjust his machine so as to obtain an exact copy of the required article. It is obvious that by the ordinary system of glass-working such a result is utterly impossible.

What we claim as our invention is—

1. The holder F, in combination with the grinding-wheel, used in cutting glass, gems, marble, &c., and also in combination with the polishing-wheels used in our machine, the whole constructed and operated substantially and for the purpose as hereinbefore set forth.

2. The machine for presenting to the grinding-wheel the object to be shaped, consisting of the lower sliding frame B, the center bearing-platform C, the turn-table D, the bearing-carriage E, and the apron or aprons for protecting the working parts against the action of the gritty substances used in cutting and polishing stone, the whole constructed and operated substantially and for the purpose as hereinbefore set forth.

3. The grinding-wheel $a^3$, in combination with the sliding frame $j^1$, the adjustable shaft $j^6$, and the adjustable frame $j^9$, bearing the adjustable wheel $a^3$, the whole constructed and operated substantially and for the purpose as hereinbefore set forth.

4. The grinding-wheel $a^3$, in combination with the pivoting-platform $a^9$, the whole constructed and operating substantially and for the purpose as hereinbefore set forth.

5. The chuck G for holding lenses, in combination with the adjustable bearing-frame $e^4$ and a grinding-wheel.

6. The chuck H for holding rings, sections of rings, or cylinders, in combination with a grinding-wheel, the whole constructed and operated substantially and for the purpose as hereinbefore set forth.

7. The rocking-bearer I for holding sections of cylinders or of spheres and presenting their outside and inside surfaces to the grinding-wheel, the whole constructed and operated substantially and for the purpose as hereinbefore set forth.

8. The groove cut in the periphery of disks for lenses or other objects requiring perfect parallelism of opposite sides, the whole constructed and operated substantially and for the purpose as hereinbefore set forth.

JEAN PIERRE COLNÉ.
CHARLES COLNÉ.

Witnesses:
CHARLES FLAESCH,
JOS. T. K. PLANT.